(12) United States Patent
Chen

(10) Patent No.: US 7,041,375 B2
(45) Date of Patent: May 9, 2006

(54) POLYVINYL BUTYRAL SHEET WITH BIFUNCTIONAL SURFACE MODIFYING AGENT

(75) Inventor: Wenjie Chen, Amherst, MA (US)

(73) Assignee: Solutia Incorporated, St. Louis, MO (US)

( * ) Notice: Subject to any disclaimer, the term of this patent is extended or adjusted under 35 U.S.C. 154(b) by 0 days.

(21) Appl. No.: 10/457,642

(22) Filed: Jun. 9, 2003

(65) Prior Publication Data

US 2006/0008653 A1 Jan. 12, 2006

(51) Int. Cl.
*B32B 17/10* (2006.01)
*B32B 27/40* (2006.01)

(52) U.S. Cl. .............. 428/423.1; 428/425.6; 428/436; 428/437; 428/442; 428/522

(58) Field of Classification Search ............ 428/423.1, 428/425.6, 436, 437, 442, 522
See application file for complete search history.

(56) References Cited

U.S. PATENT DOCUMENTS

| | | | |
|---|---|---|---|
| 4,226,818 A | 10/1980 | Brower et al. | 264/40.1 |
| 4,287,107 A | 9/1981 | Hermann et al. | 260/28.5 |
| 4,600,655 A * | 7/1986 | Hermann et al. | 428/437 |
| 4,751,266 A | 6/1988 | Hermann et al. | 525/61 |
| 4,968,745 A | 11/1990 | Misra et al. | 525/61 |
| 4,999,078 A | 3/1991 | Misra et al. | 156/327 |
| 4,999,253 A | 3/1991 | Misra et al. | 428/515 |
| 5,030,688 A | 7/1991 | Misra et al. | 525/61 |
| 5,246,764 A | 9/1993 | LaPorte et al. | 428/195 |
| 5,478,412 A | 12/1995 | Simon et al. | 428/142 |
| 5,547,736 A | 8/1996 | Simon et al. | 428/143 |
| 5,594,069 A | 1/1997 | David et al. | 525/61 |
| 5,595,818 A | 1/1997 | Hopfe et al. | 428/327 |
| 5,618,863 A | 4/1997 | D'Errico et al. | 524/91 |
| 5,728,472 A | 3/1998 | D'Errico | 428/437 |
| 5,773,102 A | 6/1998 | Rehfeld | 428/34 |
| 6,093,471 A | 7/2000 | Hopfe et al. | 428/141 |
| 6,136,486 A | 10/2000 | Nguyen | 430/66 |
| 6,372,352 B1 | 4/2002 | Bletsos et al. | 428/441 |

FOREIGN PATENT DOCUMENTS

| | | |
|---|---|---|
| DE | 199 38 159 A1 | 2/2001 |
| DE | 100 64 373 A1 | 6/2002 |
| JP | 57100942 | 12/1983 |
| JP | 2001139352 | 5/2001 |
| WO | WO 97/24230 | 7/1997 |

\* cited by examiner

*Primary Examiner*—D. S. Nakarani
(74) *Attorney, Agent, or Firm*—Brenc Law

(57) ABSTRACT

A polymer sheet having enhanced blocking resistance properties comprising a bifunctional surface modifying agent disposed at a surface of the plasticized polyvinyl butyral sheet. The bifunctional surface modifying agent comprises an anti-blocking segment comprising a polyethylene block or a hydrocarbon chain block and a compatibility segment comprising a poly(alkylene glycol) block. A method of manufacturing a polymer sheet having enhanced blocking resistance properties comprises melt processing a polymer into a sheet and disposing a bifunctional surface modifying agent at a surface of the polymer sheet, the bifunctional surface modifying agent comprising a polyethylene block or a hydrocarbon chain block and a poly(alkylene glycol) block. A method of enhancing the blocking resistance of a polymer sheet comprises disposing a bifunctional surface modifying agent at a surface of the polymer sheet, the bifunctional surface modifying agent comprising an anti-blocking segment comprising a polyethylene block or a hydrocarbon chain block and a compatibility segment comprising a poly(alkylene glycol) block.

40 Claims, No Drawings

POLYVINYL BUTYRAL SHEET WITH BIFUNCTIONAL SURFACE MODIFYING AGENT

This disclosure relates to polymer sheets and, more particularly, to polymer sheets comprising polyvinyl butyral having enhanced blocking resistance provided via a bifunctional surface modifying agent disposed at a surface of the polyvinyl butyral sheets.

BACKGROUND

Plasticized polyvinyl butyral (hereinafter "PVB") is commonly used in the manufacture of polymer sheets for use as interlayers in light transmitting laminates such as safety glass or polymeric laminates. Safety glass typically refers to a transparent laminate comprised of a polyvinyl butyral sheet sandwiched between two panes of glass. Safety glass often is used to provide a transparent barrier in architectural and automotive openings. Its main function is to absorb energy, such as caused by a blow from an object, without allowing penetration through the opening, thus minimizing damage or injury to the objects or persons within an enclosed area. Additives to the sheet formulation generally include adhesion control agents ("ACA's") to modify adhesion of the sheet to the glass so that a suitable level of adhesion can be maintained so as to prevent spalling of the glass and yet provide adequate energy absorption on impact. The interlayer sheet also may be modified to impart additional beneficial effects to safety glass such as to attenuate acoustic noise, reduce UV and/or IR light transmission, and/or enhance the aesthetic appeal of window openings.

Safety glass typically is formed by a process in which two layers of glass and a plastic interlayer, such as PVB, are assembled into a pre-press, tacked into a pre-laminate, and finished into an optically clear laminate. The assembly phase involves laying down a piece of glass, overlaying a PVB sheet, laying down a second piece of glass, and then trimming the excess PVB to the edges of the glass layers.

The plastic interlayer generally is produced by mixing PVB polymer with one or more plasticizers, and optionally with one or more other ingredients, and melt processing the mix into sheeting, which typically is collected and rolled for storage and transportation. In the lamination process for automotive windscreens, sections of PVB sheet typically are cut from the roll and these cut sections are shaped and/or stacked for assembly. A cut section then is taken from the stack and assembled in layered arrangement with a rigid substrate (e.g., glass sheet having a particular optical quality) such that a face of the rigid substrate and a face of the cut section are disposed in intimate contact and form a pre-press laminate assembly. Alternatively, this laminate assembly may be formed by interleaving multiple cut section(s) with multiple rigid sheets.

Plasticized PVB sheet, whether in roll form or in stacked form, inherently tends to stick to itself ("block") at ambient temperatures typically encountered before and during the laminating process. Many attempts to enhance the blocking resistance of PVB have been made, including mechanical roughing of the sheet surfaces (e.g., embossing), applying a powder such as sodium bicarbonate to the sheet surfaces, and chemically or physically treating the surfaces of the PVB sheeting. Such surface treatments unfortunately often introduce undesirable handling or glass adhesion issues. In another common practice to avoid such blocking, the PVB sheeting may interleaved with another sheet material, such as polyethylene, or may be stored and transported under refrigeration, e.g., at temperatures from about 5 to about 15° C. However, for variations of standard PVB sheeting, such as PVB sheeting incorporating high plasticizer content to accomplish an enhanced noise reduction (acoustic) function, blocking may occur even under refrigeration conditions.

Additionally, it has been proposed to incorporate various blocking-resistant materials into the PVB. Incorporation of such materials into the PVB, however, may adversely affect the optical properties of the resulting laminate or the adhesive properties of the PVB sheet to glass.

Accordingly, further improved methods are needed to enhance the blocking resistance of PVB sheet, without adversely affecting optical clarity of laminates and glass adhesion properties of the resulting PVB sheet.

SUMMARY

It now surprisingly has been discovered, according to the present invention, that a polymer sheet comprising a bifunctional surface modifying agent disposed onto said polymer sheet surface results in enhanced antiblock characteristics without adverse optical and adhesion effects. Also, it has been discovered that antiblocking characteristics may be imparted to a surface of a polymer sheet by a method of manufacture comprising disposing bifunctional surface modifying agents at a surface of said polymer sheet. Further, the present invention includes a laminated safety glass comprising two sheets of glass with an interlayer polymer sheet disposed therebetween wherein the polymer sheet has a bifunctional surface modifying agent disposed onto a surface of said polymer sheet.

Disclosed herein are exemplary embodiments of a polymer sheet comprising polyvinyl butyral, a plasticizer incorporated into the polyvinyl butyral, and a bifunctional surface modifying agent disposed at the surface of plasticized polyvinyl butyral. The bifunctional surface modifying agent comprises a block copolymer of a poly(alkylene glycol) and a polyethylene chain or hydrocarbon chain which provides the agent with the bifunctions of anti-blocking and compatibility, respectively, when applied to the PVB sheet.

A method of manufacturing a polymer sheet comprises melt processing a polymer into a sheet and disposing a bifunctional surface modifying agent comprising a polyethylene block or a hydrocarbon chain block and a poly (akylene glycol) block at a surface of the polymer sheet.

A laminated safety glass comprises two sheets of glass with an interlayer polymer sheet disposed therebetween wherein the polymer sheet has a bifunctional surface modifying agent disposed onto said polymer sheet surface, said bifunctional surface modifying agent comprising, an anti-blocking segment, and a compatibility segment.

DETAILED DESCRIPTION

A plasticized polymer in sheet form, according to the present invention, has a bifunctional surface modifying agent disposed at the surface of the polymer sheet. Although the embodiments described below refer to the polymer as being PVB, it should be understood that the polymer may be any polymer having a suitable glass transition temperature. Typical such polymers include polyvinyl butyral, polyurethane, polyvinyl chloride, poly(ethylene-co-vinyl acetate), combinations of the foregoing, and the like. The bifunctional nature of the surface modifying agent is provided by an anti-blocking function and a compatibility function. Thus, the bifunctional surface modifying agent comprises a polymer having an amphiphilic structure having an anti-blocking segment and a compatibility segment. The anti-blocking segment enhances the blocking resistance of the polymer sheet, and the compatibility segment imparts suitable compatibility to the polymer sheet that allows the optical clarity of the polymer sheet and optimum adhesion properties of the polymer sheet to glass to be maintained.

PVB generally is produced by known acetalization processes which involve reacting PVOH with butyraldehyde in the presence of acid catalyst, followed by neutralization of the catalyst, separation, stabilization and drying of the resin. The polymer typically comprises about 13 to about 30 weight percent (wt. %) hydroxyl groups calculated as PVOH, and preferably about 15 to about 22 wt. % hydroxyl groups calculated as PVOH. The polymer further comprises up to about 10 wt. % residual ester groups and preferably up to about 3 wt. % residual ester groups calculated as polyvinyl acetate with the balance being an acetal, preferably butyraldehyde acetal, but optionally including other acetal groups, e.g., a 2-ethyl hexanal-group. Typically, the product PVB has a molecular weight greater than about 70,000 grams per mole (g/mole). As used herein, the term "molecular weight" should be construed as the average molecular weight. Details of suitable processes for making PVB are known to those skilled in the art. PVB is commercially available from Solutia Inc., St. Louis, Mo. as Butvar™ resin.

Additives may be added to the PVB polymer to enhance its performance in a final product. Such additives include, but are not limited to, dyes, pigments, stabilizers (e.g., ultraviolet stabilizers), antioxidants, combinations of the foregoing additives, and the like.

The PVB sheet typically comprises about 20 to 80, and more commonly 25 to 60, parts plasticizer per one hundred parts of resin ("phr"). The amount of plasticizer affects the $T_g$ of the PVB sheet. Normally, increasing the amounts of plasticizer decreases the $T_g$. Generally, the PVB sheets have a $T_g$ of about 30° C. or less. PVB sheets having a $T_g$ lower than about 20° C. are often used as acoustic PVB sheets. Plasticizers commonly employed are esters of a polybasic acid or a polyhydric alcohol. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217. Also commonly employed plasticizers are mixed adipates made from $C_4$ to $C_9$ alkyl alcohols and cyclo $C_4$ to $C_{10}$ alcohols, as disclosed in U.S. Pat. No. 5,013,779. $C_6$ to $C_8$ adipate esters, such as dihexyl adipate, are preferred plasticizers.

The PVB polymer and plasticizer additives are thermally processed and configured into sheet form. One exemplary method of forming a PVB sheet comprises extruding molten PVB resin+plasticizer+additives (hereinafter "melt") by forcing the melt through a sheet die (e.g., a die having an opening that is substantially greater in one dimension than in a perpendicular dimension). Another exemplary method of forming a PVB sheet comprises casting molten resin or semi-molten resin from a die onto a roller, solidifying the resin, and subsequently removing the solidified resin as a sheet. In either embodiment, the surface texture at either or both sides of the sheet may be controlled by adjusting the surfaces of the die opening or by providing texture at the roller surface. Other techniques for controlling the sheet texture include varying parameters of the reactant materials (e.g., the water content of the resin and/or the plasticizer, the melt temperature, or combinations of the foregoing parameters). Furthermore, the sheet can be configured to include spaced projections that define a temporary surface irregularity to facilitate the de-airing of the sheet during lamination processes after which the elevated temperatures and pressures of the laminating process cause the projections to melt into the sheet, thereby resulting in a smooth finish. In any embodiment, the extruded sheets typically have thicknesses of about 0.3 to about 2.5 millimeters (mm).

The bifunctional surface modifying agent is preferably disposed at the PVB sheet surface either by being directly disposed as a coating at the surface of the PVB sheet or by first being incorporated into the bulk of the sheet material and then migrating to the surfaces of the formed PVB sheet. The bifunctional surface modifying agent comprises the anti-blocking segment and the compatibility segment. The anti-blocking segment preferably comprises a polyethylene block or hydrocarbon chain block and the compatibility segment preferably comprises a poly(alkylene glycol) block. A general formula of the bifunctional surface modifying agent preferably is represented by:

wherein $R_1$ is an alkylene, $R_2$ is a polyethylene or hydrocarbon chain, and n is the number of alkylene glycol repeat units. Preferred bifunctional surface modifying agents comprise an amphiphilic polyethylene-block-poly(ethylene glycol) polymer (hereinafter "PEPEG") having the general formula

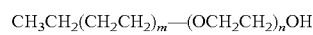

wherein m is about 5 to about 24 and n is about 3 to about 30. In such an embodiment, the polyethylene block is preferably anchored at the surface of the PVB sheet via the poly(ethylene glycol) block. More preferably, the polyethylene block crystallizes within the microdomain of the polymer to form a nanostructured layer over the poly (ethylene glycol) block. Formation of a nanostructured layer over the poly(ethylene glycol) block facilitates the reduction of blocking of the PVB sheet, particularly when the sheet is rolled.

Exemplary techniques of disposing the bifunctional surface modifying agent at the PVB sheet surface include, but are not limited to, the physical application of the agent to the sheet surface. Physical applications of the agent include, but are not limited to, spray coating techniques, immersion (dipping) techniques, gravure coating techniques, melt-extrusion techniques, and the like. In one exemplary spray coating technique, the agent is disposed in a liquid carrier, atomized, and projected at the surface of the PVB sheet. In one exemplary embodiment of an immersion technique, the PVB sheet is immersed in a liquid carrying the modifying agent such that upon retrieval of the sheet and volatilization of the carrier, the sheet surfaces are coated with the agent. In one exemplary gravure coating technique, the modifying agent in an aqueous or solvent-based solution is picked up by a patterned chrome-plated roll (gravure roll), the excess agent is doctored off, and the liquid is transferred from the filled cells of the gravure roll to the PVB web. In, any technique, the carrier may be aqueous or solvent-based (e.g., ethanol, methanol, acetone, methyl ethyl ketone, combinations of the foregoing, and the like). Once deposited at the PVB sheet, the carrier is volatilized off, thereby leaving the modifying agent deposited on the surface of the PVB sheet. The concentration of modifying agent in the carrier should be sufficient to achieve the desired concentration of agent at the surface of the sheet. In a typical spray technique, the concentration of bifunctional surface modifying agent in the carrier is about 0.1 to about 40 wt. % based on the total weight of the liquid. In any of the aforementioned coating techniques, the amount of bifunctional surface modifying agent incorporated onto the polymer sheet surface is about 50 to about 30,000 parts per million (ppm), preferably about 150 to about 10,000 ppm, and more preferably about 300 to about 5,000 ppm.

In an exemplary embodiment of a melt-extrusion technique, the bifunctional surface modifying agent can be incorporated into the PVB sheet by melt-mixing the agent with plasticized PVB resin and melt-extruding or melt-processing the mixture into the sheet. Upon cooling the extruded or pressed sheet to about 15 degrees C., the bifunctional surface modifying agent migrates to the sheet surface. The agent is provided in the melt at a concentration sufficient to provide the desired blocking resistance properties while maintaining optical clarity and adhesion properties. In another exemplary embodiment of a melt-blending technique, the agent can be co-extruded with the PVB resin to provide a laminate structure comprising any combination of PVB- and PVB-modifying agent incorporated sheets.

The resultant PVB sheet containing the bifunctional surface modifying agent has a blocking value of at least about 50%, preferably at least about 70%, and more preferably at least about 90% less than the blocking value of a polymer sheet comprising PVB resin without the bifunctional surface modifying agent. The clarity of the PVB sheet with or without a bifunctional surface modifying agent may be determined by measuring the haze value, which is a percentage of transmitted light that is scattered so that its direction deviates more than a specified angle from the direction of the incident beam, and which may be determined according to ASTM D1003. Preferably, the haze value is less than about 3%, more preferably less than about 2%, and most preferably less than about 1%.

The adhesion of the PVB sheet containing the bifunctional surface modifying agent is substantially unaffected by the presence of the bifunctional surface modifying agent. Preferably, the adhesion value (quantification of the tendency of the PVB sheet to adhere to glass) is within about 20%, more preferably within about 10%, and most preferably within about 5% of the adhesion value of a PVB sheet not having a bifunctional surface modifying agent. Adhesion may be measured by, but is not limited to being measured by, pummel adhesion tests (tests that measure the bond strength between the PVB sheet and the glass).

EXAMPLES

The following tests were used in the Examples:

1. Pummel Adhesion

Two-ply glass laminate samples are prepared with standard autoclave lamination conditions. The laminates are cooled to −17.8° C. and manually pummeled with a hammer to break the glass. All broken glass unadhered to the PVB sheet is then removed, and the amount of glass left adhered to the PVB sheet is visually compared with a set of standards. The standards correspond to a scale in which varying degrees of glass remain adhered to the PVB sheet. In particular, at a pummel standard of zero, no glass is left adhered to the PVB sheet. At a pummel standard of 10, 100% of the glass remains adhered to the PVB sheet.

2. Blocking

This test measures the tendency of the PVB sheet to adhere to itself. In this test, two rectangular filmstrips are cut and placed together in completely overlapping pairs. The top sheet of each pair is adhered to a piece of tape of a corresponding size. The film pairs are placed centrally between two steel plates and the assembly is subjected to 69 kPa pressure at the temperatures of 7° C. for 24 hours. The strips are then peeled apart in a 90 degree peel test using a peel testing apparatus at a peel speed of 84 inches per minute. The blocking force is quantified in pounds per linear inch (PLI).

3. % Haze (Clarity)

This test measures the clarity of the laminate made with PVB sheet and is performed in accordance with ASTM D1003-61 (Re-approved 1977)-Procedure A—using Illuminant C, an observer angle of 2 degrees, and an apparatus for measuring the amount of haze is a Hazemeter, Model D25, which is available from Hunterlab.

Example 1

Manufacture of a PVB Sheet

Plasticized PVB formulation to make PVB sheets was pre-mixed using a high intensity mixer. The formulation included 100 parts by weight PVB resin having 16.3 wt. % hydroxyl content calculated as PVOH, 52 parts triethylene glycol di-(2-ethylhexanoate), and other additives including an adhesion control agent, ultraviolet light absorbents, an antioxidant, and other ingredients. The plasticized formulation was then melted in an extruder and forced in melt form through a sheeting die having a rectangular die opening at its forward end delimited by a pair of opposing die lips. The temperature of the melt is about 180 degrees C. The thickness of the extruded sheet is about 30 mils (0.76 mm). Each side of the sheet has a rough surface that allows air to be removed from the interface of the sheet and the glass during lamination process.

Example 2

Spray Coating of the PVB Sheet

In a typical spray coating process, an air atomizer and an external source of compressed air, usually supplied at a pressure of about 70 to about 700 kiloPascals (kPa) (about 10 to about 100 pounds per square inch (psi)), was used to atomize the liquid containing the bifunctional surface modifying agent. The liquid containing the bifunctional surface modifying agent was prepared by dissolving or dispersing modifying agent into aqueous solutions at various concentrations. The liquids were then atomized and projected to at least one side of the surfaces of the PVB sheets using spray equipment, followed by drying processes to remove the carriers to leave the modifying agents deposited on the surfaces of the PVB sheets.

Table 1 illustrates the results of the pummel, blocking value, and haze tests for the PVB sheet samples spray-coated with PEPEG having various molecular structures of the general formula $CH_3CH_2(CH_2CH_2)_m$—$(OCH_2CH_2)_nOH$.

Table 2 illustrates the results of the pummel, blocking value, and haze tests on PVB sheet samples spray-coated with solutions having various concentrations of $CH_3CH_2(CH_2CH_2)_{9-19}$—$(OCH_2CH_2)_{10}OH$.

Table 3 illustrates the results of the pummel, blocking value, and haze tests on PVB sheet samples spray-coated with solutions having various concentrations of $CH_3CH_2(CH_2CH_2)_8$—$(OCH_2CH_2)_{20}OH$.

TABLE 1

| Sample Number | PEPEG | Amount of Coated PEPEG (ppm) | Blocking Value (PLI) (Coated-Coated Side) | Haze % | Pummel Adhesion (Coated/ Uncoated Side) |
|---|---|---|---|---|---|
| 1. Control | — | 0 | 3.60 | 0.7 | 4.8/3.8 |
| 2. | $CH_3CH_2(CH_2CH_2)_8-(OCH_2CH_2)_2OH$ | 1000 | 4.00 | 0.7 | 5.3/4.5 |
| 3. | $CH_3CH_2(CH_2CH_2)_{9-19}-(OCH_2CH_2)_3OH$ | 1000 | 0.49 | 0.9 | 4.8/5.8 |
| 4 | $CH_3CH_2(CH_2CH_2)_{15}-(OCH_2CH_2)_3OH$ | 1000 | 0.67 | 0.8 | 3.8/5.5 |
| 5 | $CH_3CH_2(CH_2CH_2)_{24}-(OCH_2CH_2)_4OH$ | 1000 | 0.84 | 0.9 | 3.0/6.0 |
| 6 | $CH_3CH_2(CH_2CH_2)_{15}-(OCH_2CH_2)_{10}OH$ | 1000 | 2.17 | 0.8 | 2.3/5.5 |
| 7 | $CH_3CH_2(CH_2CH_2)_{24}-(OCH_2CH_2)_{16}OH$ | 1000 | 0.90 | 0.7 | 3.5/5.0 |
| 8 | $CH_3CH_2(CH_2CH_2)_{9-19}-(OCH_2CH_2)_{10}OH$ | 1000 | 1.23 | 0.7 | 3.3/5.0 |

TABLE 2

| Sample Number | PEPEG | Amount of Coated PEPEG (ppm) | Blocking Value (PLI) (Coated-Coated Side) | Haze % | Pummel Adhesion (Coated/ Uncoated Side) |
|---|---|---|---|---|---|
| 1. Control | — | 0 | 3.60 | 0.5 | 6.5/6.0 |
| 2. | $CH_3CH_2(CH_2CH_2)_{9-19}-(OCH_2CH_2)_{10}OH$ | 1000 | 1.23 | 0.7 | 3.3/5.0 |
| 3. | $CH_3CH_2(CH_2CH_2)_{9-19}-(OCH_2CH_2)_{10}OH$ | 1500 | 0.03 | 1 | 6.0/6.0 |
| 4. | $CH_3CH_2(CH_2CH_2)_{9-19}-(OCH_2CH_2)_{10}OH$ | 2500 | 0.01 | 1 | 6.0/6.0 |

TABLE 3

| Sample Number | PEPEG | Amount of Coated PEPEG (ppm) | Blocking Value (PLI) (Coated-Coated Side) | Haze % | Pummel Adhesion (Coated Side) |
|---|---|---|---|---|---|
| 1. Control | — | 0 | 6.11 | 0.3 | 5.5 |
| 2. | $CH_3CH_2(CH_2CH_2)_8-(OCH_2CH_2)_{20}OH$ | 500 | 5.26 | 0.3 | 5.0 |
| 3. | $CH_3CH_2(CH_2CH_2)_8-(OCH_2CH_2)_{20}OH$ | 1000 | 0.07 | 0.4 | 4 |
| 4. | $CH_3CH_2(CH_2CH_2)_8-(OCH_2CH_2)_{20}OH$ | 1600 | 0.06 | 0.5 | 4.5 |
| 5. | $CH_3CH_2(CH_2CH_2)_8-(OCH_2CH_2)_{20}OH$ | 2000 | 0.06 | 0.4 | 3.5 |
| 6. | $CH_3CH_2(CH_2CH_2)_8-(OCH_2CH_2)_{20}OH$ | 2600 | 0.10 | 0.4 | 3.5 |
| 7. | $CH_3CH_2(CH_2CH_2)_8-(OCH_2CH_2)_{20}OH$ | 4000 | 0.33 | 0.3 | 3.0 |

Example 3

Gravure Coating PVB Sheet

A gravure coating apparatus having a variety of interchangeable quadrangular cylinder heads (QCH) per unit was used to coat the PVB sheet with a 10 wt. % aqueous solution of PEPEG $(CH_3CH_2(CH_2CH_2)_8$—$(OCH_2CH_2)_{20}OH)$ at various coating thicknesses. Table 4 illustrates the results of the pummel, blocking value, and haze tests for PVB sheet coated by such a method.

TABLE 4

| Sample Number | Gravure Coating Condition | Blocking Value (PLI) | | Haze % | Pummel Adhesion (Coated/Uncoated) |
| | | Coating side - Coated side | Coated side - Uncoated side | | |
|---|---|---|---|---|---|
| 1. Control | — | 2.93 | 2.93 | 0.6 | 3.5/5.5 |
| 2. | 55 QCH[a], 1:1[b] | 0.09 | 0.39 | 0.4 | 3.5/5 |
| 3. | 55 QCH[a], 1:0.75[b] | 0.06 | 0.45 | 0.4 | 3.5/5.5 |
| 4. | 72 QCH[a], 1:1[b] | 0.36 | 0.93 | 0.4 | 3/4.5 |
| 5. | 72 QCH[a], 1:0.75[b] | 0.10 | 0.60 | 0.4 | 3.5/6.5 |

[a]QCH, quadrangular cylinder head, a unit measures the cell volume per unit area on the gravure roll.
[b]The ratio of the rotation speed of backing roll to gravure roll. The speed of the backing roll is 20 feet per minute (ft/min).

Example 4

PVB Sheet Containing PEPEG Prepared by Melt-Mixing

The mixture of 100 parts by weight PVB resin having 16.3 wt. % hydroxyl content calculated as PVOH, 52 parts by weight triethylene glycol di-(2-ethylhexanoate), about 0.1 to about 0.2 parts by weight PEPEG, and other additives including adhesion control agents, ultraviolet light absorbents, antioxidants, and the like, was melt-mixed at 180 degrees C. for 7 minutes in a Brabender mixer and melt-pressed at about 150 degrees C. to prepare a PVB sheet having a thickness of about 0.76 mm (0.03 inches). Table 5 illustrates the results of the pummel, blocking value, and haze tests on samples of PVB sheets containing PEPEG.

TABLE 5

| Sample Number | PEPEG | Amount of PEPEG (phr) | Blocking Value (PLI) | Haze % | Pummel Adhesion |
|---|---|---|---|---|---|
| 1. Control | — | — | 1.69 | 0.8 | 2.5 |
| 2 | $CH_3CH_2(CH_2CH_2)_{15}$—$(OCH_2CH_2)_{10}OH$ | 0.1 | 0.41 | 1.4 | 2 |
| 3 | $CH_3CH_2(CH_2CH_2)_{15}$—$(OCH_2CH_2)_{10}OH$ | 0.2 | 0.18 | 1.9 | 2 |
| 4 | $CH_3CH_2(CH_2CH_2)_{9-19}$—$(OCH_2CH_2)_{10}OH$ | 0.1 | 0.74 | 1.0 | 2 |
| 5 | $CH_3CH_2(CH_2CH_2)_{9-19}$—$(OCH_2CH_2)_{10}OH$ | 0.2 | 0.42 | 1.95 | 2 |

The above-described embodiments of PVB sheets having bifunctional surface modifying agent disposed on the surfaces thereof are suitable for use in typical PVB interlayer applications for laminated safety glass. Furthermore, the above-described embodiments, because of the enhanced blocking resistance provided via the modification of the sheet surfaces, are especially useful in manufacturing non-interleaving acoustic PVB interlayer product.

The PVB sheets as described above also have several advantages over PVB sheets that do not have bifunctional surface modifying agents disposed on their surfaces. Firstly, the PVB sheet having the bifunctional surface modifying agent disposed on its surfaces has a considerably reduced tendency to block while maintaining sufficient optical quality and optimum adhesion properties to glass when the PVB sheet is incorporated into laminated safety glass. By having a reduced tendency to block, the PVB sheet can then be stored and transported with a reduced need for refrigeration or interleaving. Secondly, because the bifunctional surface modifying agents disclosed above are at least partially compatible with the PVB, additional processing steps such as washing the sheet to remove powder do not need to be performed. Other advantages will be readily apparent to those skilled in the art.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

I claim:

1. A polymer sheet, comprising:
   a bifunctional surface modifying agent, said bifunctional surface modifying agent comprising,
   an anti-blocking segment, and
   a compatibility segment, wherein said bifunctional surface modifying agent comprises a polyethylene-block-poly(ethylene glycol) polymer.

2. The polymer sheet of claim 1, wherein said bifunctional surface modifying agent is sprayed onto a surface of said polymer sheet.

3. The polymer sheet of claim 1, wherein said bifunctional surface modifying agent is disposed on a surface of said polymer sheet by immersing said polymer sheet into a solution containing said bifunctional surface modifying agent.

4. The polymer sheet of claim 1, wherein said bifunctional surface modifying agent is melt-blended into a polymer melt used to form said polymer sheet.

5. The polymer sheet of claim 1, wherein an amount of bifunctional surface modifying agent disposed on said polymer sheet is about 50 to about 30,000 ppm.

6. The polymer sheet of claim 1, wherein an amount of bifunctional surface modifying agent disposed at on said polymer sheet is about 150 to about 10,000 ppm.

7. The polymer sheet of claim 1, wherein an amount of bifunctional surface modifying agent disposed on said polymer sheet is about 300 to about 5,000 ppm.

8. The polymer sheet of claim 1 wherein said polymer sheet comprises a polymer selected from the group consisting of polyvinyl butyral, polyurethane, polyvinyl chloride, poly(ethylene-co-vinyl acetate), and combinations thereof.

9. The polymer sheet of claim 8 wherein said polymer is polyvinyl butyral.

10. The polymer sheet of claim 9 wherein said polymer is a polyvinyl butyral resin comprising about 13 to about 30 weight percent hydroxyl groups calculated as PVOH.

11. The polymer sheet of claim 9 wherein said polymer is a plasticized polyvinyl butyral wherein the plasticizer comprises about 20 to 80 parts plasticizer per one hundred parts of resin.

12. The polymer sheet of claim 11 wherein said polymer is a plasticized polyvinyl butyral wherein the plasticizer comprises about 25 to 60 parts plasticizer per one hundred parts of resin.

13. The polymer sheet of claim 12 wherein said polymer is a plasticized polyvinyl butyral wherein the plasticizer is selected from the group consisting of triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, and mixtures thereof.

14. A polymer sheet, comprising:
   a bifunctional surface modifying agent, said bifunctional surface modifying agent comprising,
   an anti-blocking segment, and
   a compatibility segment, wherein said bifunctional surface modifying agent comprises an amphiphilic polyethylene-block-poly(ethylene glycol) polymer having the general formula:

CH$_3$CH$_2$(CH$_2$CH$_2$)$_m$—(OCH$_2$CH$_2$)$_n$OH wherein m is about 5 to about 24 and n is about 3 to about 30.

15. The polymer sheet of claim 14, wherein said bifunctional surface modifying agent is sprayed onto a surface of said polymer sheet.

16. The polymer sheet of claim 14, wherein said bifunctional surface modifying agent is disposed on a surface of said polymer sheet by immersing said polymer sheet into a solution containing said bifunctional surface modifying agent.

17. The polymer sheet of claim 14, wherein said bifunctional surface modifying agent is melt-blended into a polymer melt used to form said polymer sheet.

18. The polymer sheet of claim 14, wherein an amount of bifunctional surface modifying agent disposed on said polymer sheet is about 50 to about 30,000 ppm.

19. The polymer sheet of claim 14, wherein an amount of bifunctional surface modifying agent disposed on said polymer sheet is about 150 to about 10,000 ppm.

20. The polymer sheet of claim 14, wherein an amount of bifunctional surface modifying agent disposed on said polymer sheet is about 300 to about 5,000 ppm.

21. The polymer sheet of claim 14 wherein said polymer sheet comprises a polymer selected from the group consisting of polyvinyl butyral, polyurethane, polyvinyl chloride, poly(ethylene-co-vinyl acetate), and combinations thereof.

22. The polymer sheet of claim 21 wherein said polymer is polyvinyl butyral.

23. The polymer sheet of claim 22 wherein said polymer is a polyvinyl butyral resin comprising about 13 to about 30 weight percent hydroxyl groups calculated as PVOH.

24. The polymer sheet of claim 22 wherein said polymer is a plasticized polyvinyl butyral wherein the plasticizer comprises about 20 to 80 parts plasticizer per one hundred parts of resin.

25. The polymer sheet of claim 24 wherein said polymer is a plasticized polyvinyl butyral wherein the plasticizer comprises about 25 to 60 parts plasticizer per one hundred parts of resin.

26. The polymer sheet of claim 25 wherein said polymer is a plasticized polyvinyl butyral wherein the plasticizer is selected from the group consisting of triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, and mixtures thereof.

27. A laminated safety glass comprising two sheets of glass with an interlayer polymer sheet disposed therebetween wherein said polymer sheet comprises a bifunctional surface modifying agent, said bifunctional surface modifying agent comprising,
   an anti-blocking segment, and
   a compatibility segment, wherein said bifunctional surface modifying agent comprises a polyethylene-block-poly(ethylene glycol) polymer.

28. The laminated safety glass of claim 27, wherein said polyethylene-block-poly(ethylene glycol) polymer has the general formula:

CH$_3$CH$_2$(CH$_2$CH$_2$)$_m$—(OCH$_2$CH$_2$)$_n$OH wherein m is about 5 to about 24 and n is about 3 to about 30.

29. The laminated safety glass of claim 28, wherein said bifunctional surface modifying agent is sprayed onto a surface of said polymer sheet.

30. The laminated safety glass of claim 28, wherein said bifunctional surface modifying agent is disposed on a surface of said polymer sheet by immersing said polymer sheet into a solution containing said bifunctional surface modifying agent.

31. The laminated safety glass of claim 28, wherein said bifunctional surface modifying agent is melt-blended into a polymer melt used to form said polymer sheet.

32. The laminated safety glass of claim 28, wherein an amount of bifunctional surface modifying agent disposed on said polymer sheet is about 50 to about 30,000 ppm.

33. The laminated safety glass of claim 28, wherein an amount of bifunctional surface modifying agent disposed on said polymer sheet is about 150 to about 10,000 ppm.

34. The laminated safety glass of claim 28, wherein an amount of bifunctional surface modifying agent disposed on said polymer sheet is about 300 to about 5,000 ppm.

35. The laminated safety glass of claim 28 wherein said polymer sheet comprises a polymer selected from the group consisting of polyvinyl butyral, polyurethane, polyvinyl chloride, poly(ethylene-co-vinyl acetate), and combinations thereof.

36. The laminated safety glass of claim 35 wherein said polymer is polyvinyl butyral.

37. The laminated safety glass of claim 36 wherein said polymer is a polyvinyl butyral resin comprising about 13 to about 30 weight percent hydroxyl groups calculated as PVOH.

38. The laminated safety glass of claim 36 wherein said polymer is a plasticized polyvinyl butyral wherein the plasticizer comprises about 20 to 80 parts plasticizer per one hundred parts of resin.

39. The laminated safety glass of claim 36 wherein said polymer is a plasticized polyvinyl butyral wherein the plasticizer comprises about 25 to 60 parts plasticizer per one hundred parts of resin.

40. The laminated safety glass of claim 39 wherein said polymer is a plasticized polyvinyl butyral wherein the plasticizer is selected from the group consisting of triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, and mixtures thereof.

* * * * *